United States Patent Office.

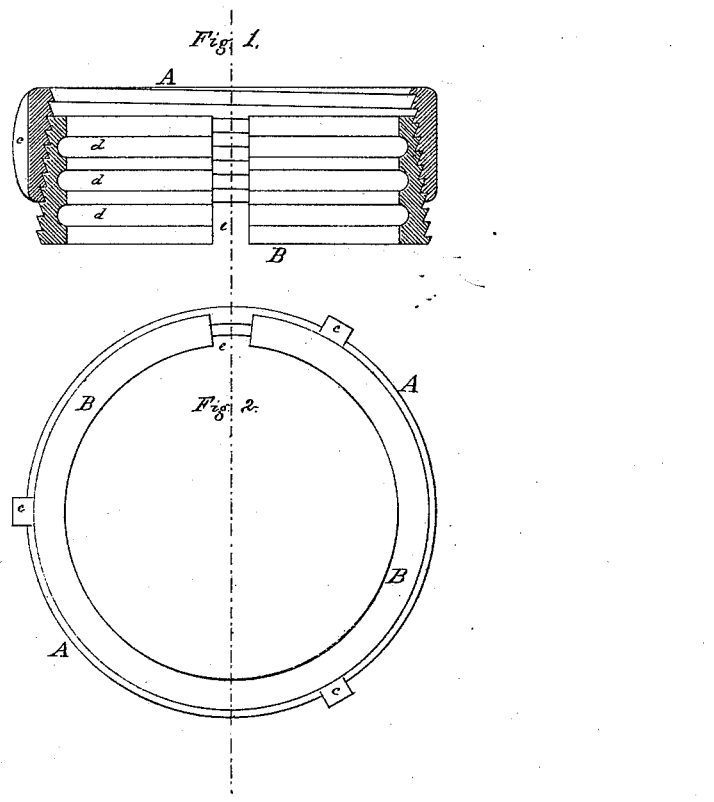

GEORGE SEWELL, OF BROOKLYN, NEW YORK.

Letters Patent No. 111,981, dated February 21, 1871.

IMPROVEMENT IN HOSE-RINGS.

The Schedule referred to in these Letters Patent and making part of the same.

*To all whom it may concern:*

Be it known that I, GEORGE SEWELL, of Brooklyn, in the county of Kings and State of New York, have invented a new and useful Improvement in Attaching Hose to Couplings; and I hereby declare the following to be a full and exact description of the same, reference being had to the accompanying drawing which forms a part of this specification.

The object of this invention is to secure in a firm manner the coupling to hose, tubes, and the like, without injury to the hose.

My invention consists of an inner open ring clasped and drawn together by an outer closed ring, so as to bind and clasp the end of the hose between the outside of the shank of the coupling and the inside of the open ring. The shanks of the coupling are usually formed with corrugations or grooves. The inside of the open ring is grooved in a similar manner, so that the grip on the end of the hose is made very firm.

The following description will enable any one to make and use my invention.

In the drawing—

Figure 1 is a sectional view and elevation, and
Figure 2 a plan view.

The same letters refer to like parts in both figures.

The essential parts of the invention are two metallic rings, A and B, having inclined surfaces, upon which a thread or screw is cut so that one will fit into and over the other, as shown in fig. 1. The inner ring B has a piece taken out, as shown at *e*, figs. 1 and 2. Since the inner face of ring A is inclined to the outer face of ring B, when ring A is screwed over ring B the diameter of B is contracted so as to close more or less the opening or slot *e* and bind ring B close around the end of the hose.

The outer ring A is provided with lugs C, to receive a wrench or spanner, so as to apply power to screw up the ring A. Similar lugs may be placed on the lower side of ring B, so as to hold it from turning until it is firmly grasped on the end of the coupling.

The following is the mode of using my invention:

The open ring B is placed upon the end of the hose, and ring A placed so that its screw-threads engage with the screw on B. The shank of the coupling is then inserted in the end of the hose. Now, it will be evident that, by turning ring A so as to bring it over ring B, the diameter of the latter will be contracted and it firmly grasped around the end of the hose.

To make the binding still firmer, the inside of ring B may be provided with bars *d d d*, as shown in fig. 1.

By the use of this invention couplings of any of the ordinary forms may be readily attached to and detached from hose, so that, in case of accident to either, it may be replaced.

The hose is not liable to be cut, as it is when a thimble is screwed directly upon it, and my invention is far more simple and efficient than the modes of fastening the hose to the couplings now in use.

Having thus described my invention,

What I claim, and desire to secure by Letters Patent of the United States, is—

The closed screw-ring A, in combination with the open screw-ring B, arranged so as to attach hose to couplings, substantially as described.

GEORGE SEWELL.

Witnesses:
C. H. MORRELL,
JOHN A. WALLACE.